UNITED STATES PATENT OFFICE.

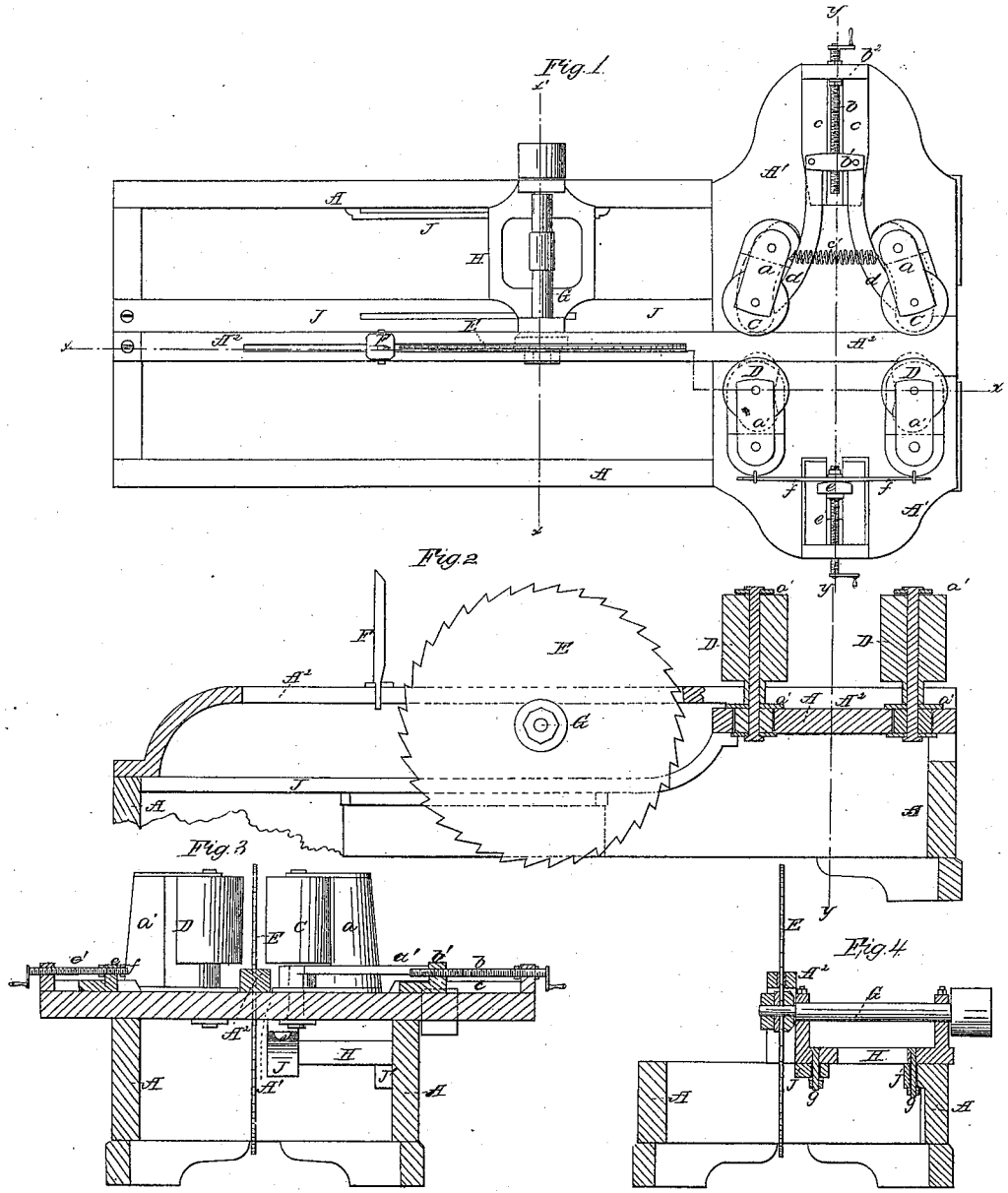

C. B. ROGERS, OF NORWICH, CONNECTICUT, ASSIGNOR TO C. B. ROGERS & CO., OF SAME PLACE.

IMPROVEMENT IN SAWING-MACHINES.

Specification forming part of Letters Patent No. 46,425, dated February 14, 1865.

*To all whom it may concern:*

Be it known that I, C. B. ROGERS, of Norwich, New London county, State of Connecticut, have invented a new and Improved Re-sawing-Machine; and I do hereby declare that the following is a full, clear, and exact description thereof, reference being had to the accompanying drawings, making a part of this specification, in which—

Figure 1 is a plan view of my improved machine. Fig. 2 is a longitudinal section through the machine, taken in the vertical plane indicated by the course of the red line $x\,x$, Fig. 1. Fig. 3 is a vertical transverse section taken at the point indicated by red lines $y\,y$, Figs. 1 and 2. Fig. 4 is a cross-section taken through Fig. 1 at the point $x'\,x'$.

Similar letters of reference indicate corresponding parts in the several figures.

The object of this invention is to so arrange and support the feed-rollers of a resawing-machine that a single screw operating directly upon both rollers simultaneously can be employed for adjusting and setting them at any desired point, according to the thickness of the stuff required, as will be hereinafter described.

Another object of my invention is to apply to the opposite pair or set of rollers a contrivance by means of which these rolls can be moved by a single adjusting-screw and also allowed to yield independently of each other, or together, and accommodate themselves to the unequal thickness of stuff fed to the saw, at the same time affording a sufficient pressure to secure a uniform feed, as will be hereinafter described.

Another object of my invention is to provide for the use of circular saws of different diameters in such manner that whether the saw which it is desired to employ be large or small it can be set close up to the feed-rolls, as will be hereinafter described.

Another object of my invention is to employ an adjustable guide in a resawing-machine which is adapted for using large and small saws, said guide being so arranged that it can be adjusted back or forward, according to the size of the saw used, and thus kept close to the edge thereof, as will be hereinafter described.

To enable others skilled in the art to make and use my invention, I will describe its construction and operation.

In the accompanying drawings, A represents an oblong rectangular bed or frame, which is elevated at one end to support the horizontal table A', over which the stuff passes as it is fed up to the saw. Upon this elevated table A' are arranged four perpendicular rollers, C C D D, between which the stuff is fed and guided up to the saw. The two feed-rollers C C, as well as those lettered D D, are remounted in frames $a\,a\,a'\,a'$, and each roller has an independent pivot-bearing in its respective frame, so that when either one or all of these frames are moved the rollers will necessarily move with them. These rollers are arranged in pairs, one pair being located on one side of the elevated horizontal strip $A^2$ and the other pair on the opposite side thereof. The feed-rollers C C, together with their respective frames $a\,a$, are secured upon the table A' by passing the arbors of these rollers down through curved slots which are made through the table A and applying washers and nuts on the lower ends of these arbors, as shown in Figs. 2 and 3. The bottom plates of the roller-carrying frames $a\,a$ are made of sufficient width and length to afford a firm bearing and keep the rollers in a steady upright position on the table. The upright standards of these frames are made sufficiently strong to serve as braces for resisting the strain upon the rollers during the operation of feeding the stuff to the saw. These roller-carrying frames are moved up to and from the work by means of a single screw-rod, $b$, acting upon a slide, $b'$, working in parallel guides $c\,c$. The slide $b'$, through which the screw-rod $b$ is tapped, has two curved arms, $d\,d$, pivoted to it, the opposite ends of which have hubs formed on them, through which the arbors of the rollers C C pass, as indicated in Fig. 3. The screw-rod $b$ is affixed to a pillow-block, $b^2$, and carries on its outer end a crank, by means of which said screw can be turned and the roller-carrying frames moved so as to change the position of the rollers C C. The arms $d\,d$, being pivoted to the slide $b'$, and the shafts or arbors of the rollers being arranged to work in curved slots in the table A', the rollers will be moved from each other as they are adjusted up to the work and drawn toward each other as they recede from the work. The spring $c'$, which extends from the standard of one frame, $a$, to that of the other, keeps these frames $a\ a$ in their proper position and causes them to follow the curvature of the slots through the table. The pressure-rollers D D are arranged in frames $a'\ a'$, and supported and guided upon the tables A' precisely in the manner described for the frames $a\ a$. Instead of having a rigid bearing, as in the former instance, these roller-frames $a'\ a'$ are connected to the adjustable slide $e$, which is moved by means of a screw-rod, $e'$, by means of a horizontal spring, $f$, which is centrally attached to the screw-rod $e'$ and slide $e$, as shown clearly in Fig. 1, and also attached, by means of staples, to the frames $a'\ a'$. The spring $f$, when thus applied, serves not only as a means for connecting the frames $a'\ a'$ to the slide $e$, but it also serves to allow the rollers D D, either separately or together, to yield and accommodate themselves to the varying thickness of the stuff as it is fed up to the saw.

The horizontal bridge $A^2$, on which the stuff is placed to be fed up to the saw, extends over the table A' and to the opposite end of the frame A, to which it is firmly secured. This bridge-bar, $A^2$, is slotted to receive the saw E and also the shank of a knife-shaped guide, F, which latter is arranged in the same vertical plane as the saw E, and capable of being adjusted toward or from this saw and set at the desired point. The object of this vertical guide F is to steady the stuff after it passes by the saw, and also to prevent the stuff during the operation of splitting it from cramping or binding the saw. It serves as a thin wedge to open the stuff and admit of the use of thin saws with very little set in their teeth. The saw E is affixed to the end of a horizontal transverse arbor, G, which has its bearings on a frame, H, as shown in Figs. 1 and 4. This frame is supported upon a longitudinal slotted bridge-bar, J, and a slotted shelf, J', both of which are parallel to each other. The frame H is connected to these parts—i. e., held down in place—by means of bolts and nuts $g\ g$, which when loosened will admit of the frame H being adjusted back or forward in a longitudinal direction. The object of providing an adjustable saw-frame, H, is to adapt the machine to the use of saws of different diameters and still have the saw close to the feed-rollers. In conjunction with this feature the guide F must be made adjustable, as above described, so that its position can be readily changed to adapt it to the different-sized saws.

I am aware that saw-arbors have been mounted upon sliding frames for the purpose of being adjusted so as to admit between them logs of varying widths and also for the purpose of sawing on a bevel.

I also am aware that feed-rollers have been set up and down by screws, and, further, that the frame or housing of such rollers has been mounted upon a turn-table, so as to be adjusted with respect to certain adjustments given to the saws.

The patent granted to Lorenzo Vance, March 8, 1864, shows a saw-mill having saws and rollers thus adjusted; but I am not aware that a saw-mill of the description I have represented has ever had its upright rollers adjusted as I set forth; nor am I aware that provision for the use of large and small saws in such a mill has ever been made in the manner I describe. Finally, I am not aware that an adjustable guide, with an arrangement which admits of large and small saws being used, has been devised.

Having thus described my invention, what I claim as new, and desire to secure by Letters Patent, is—

1. So arranging the feed-rollers C C in movable frames $a\ a$, and applying a screw-rod to operate upon these frames that the rollers can both be adjusted together in a plane parallel to that of the saw, the parts being constructed, arranged, and operated substantially as described.

2. The combination of pivoted arms $d\ d$, sliding cross-head $b'$, and adjusting-screw $b$, with feed-rollers which are supported in adjustable frames $a\ a$, substantially as described.

3. The spring $f$ and two frames, $a'\ a'$, of the pressure-rollers D D, in combination with the adjusting-screw $e'$ and slide $c$, substantially as and for the purposes described.

4. Providing for the use of circular saws of different diameters by mounting the saw-arbor upon a longitudinally-adjustable frame, H, constructed, arranged, and operating substantially as described.

5. The adjustable saw-arbor G, in combination with feed-rollers C D, all arranged substantially as and for the purposes described.

6. An adjustable guide, F, or its equivalent, in combination with the adjustable saw-arbor G, substantially as described.

C. B. ROGERS.

Witnesses:
LYMAN GOULD,
GEO. W. ROGERS.